INVENTOR
ROBERT L. BALLARD

July 7, 1970

R. L. BALLARD 3,519,314

MECHANO-HYDRAULIC SYSTEM FOR MINIMIZING SKIDDING

Filed July 5, 1968

INVENTOR
ROBERT L. BALLARD

BY *Nachs & Himmelman*

ATTORNEY

INVENTOR
ROBERT L. BALLARD
ATTORNEY.

United States Patent Office 3,519,314
Patented July 7, 1970

3,519,314
MECHANO-HYDRAULIC SYSTEM FOR
MINIMIZING SKIDDING
Robert L. Ballard, Meadowbrook, Pa., assignor to Hurst-Campbell, Inc., Warminster, Pa.
Filed July 5, 1968, Ser. No. 750,413
Int. Cl. B60t 8/04
U.S. Cl. 303—21                              5 Claims

ABSTRACT OF THE DISCLOSURE

In a four-wheel drive vehicle, each differeneial gear assembly includes a device which compares the relative speeds of the two axles connected thereto. The device produces a corresponding hydraulic pressure signal which is used to move an external ring to actuate one of the two three-way valves that is connected to the wheel cylinder of the slower moving wheel. When actuated, that three-way valve bleeds off hydraulic brake fluid from that wheel cylinder, decreasing the braking force, so that the slower-moving wheel is enabled to move faster thereby tending to reduce skidding. A similar system is connected to the differential gear assembly of the other pair of wheels.

BACKGROUND OF THE INVENTION

There is a demonstrated need for systems which tend to prevent or diminish skidding of vehicles on ice, wet roads, and the like which occurs when the vehicle operator applies the brakes. The skidding action, which the present system is designed to counteract, results in rotation of the wheels at different velocities despite the application of nominally the same braking pressure to all wheels. The present system is intended to be responsive to skidding which occurs either in straight-ahead motion of the vehicle or in turns. It is not intended to overcome skidding which occurs when all four wheels are rendered immobile by the brakes. Similarly it is not intended to be effective in the case of skidding which is strictly in a lateral direction.

BRIEF STATEMENT OF THE INVENTION

In accordance with the present invention, a system is provided for detecting the difference in the speed of two opposed wheels, translating the difference into a hydraulic signal, and using the hydraulic signal to actuate valves which diminish the brake pressure applied to the slower of the two opposed wheels.

DETAILED DESCRIPTION OF THE INVENTION

Figure 1:
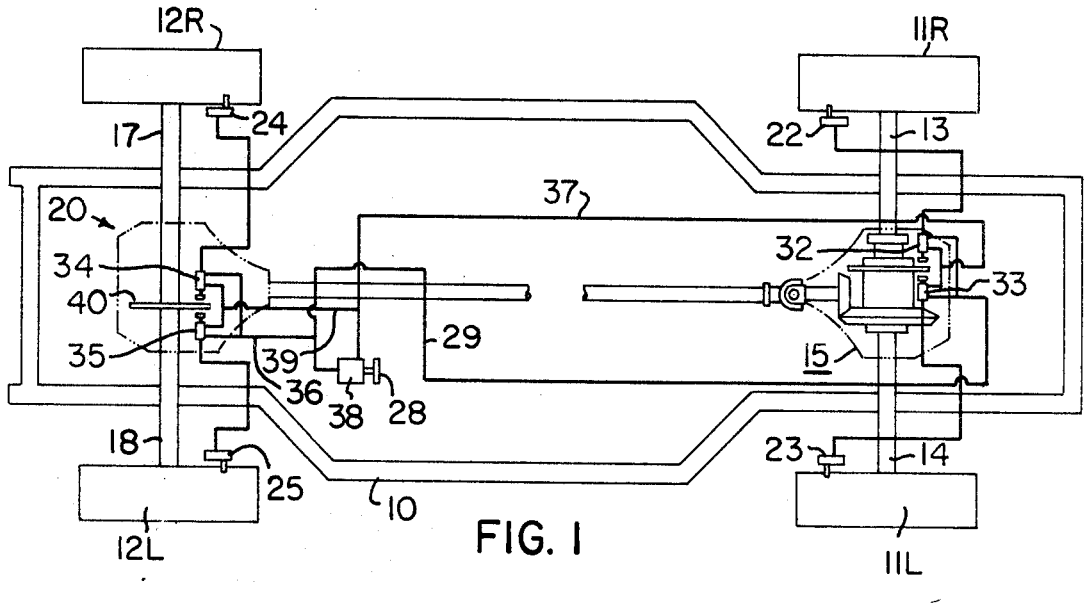
FIG. 1 is a schematic diagram taken from the underside of a four wheel drive vehicle in which the novel system is applied.

FIG. 1 shows an overall system constructed in accordance with one form of the present invention. There is shown the frame 10 of a vehicle, a pair of front wheels 11R and 11L and a pair of rear wheels 12R and 12L. This vehicle is a four wheel drive vehicle and therefore each of the pairs of opposed wheels are connected by respective axles 13, 14 and 17, 18 to differential gear assemblies shown generally at the numerals 15 and 20.

There are respectively associated with the wheels four individual hydraulic wheel cylinders 22, 23, 24 and 25. In normal operation along a straight-away, pressure on the brake pedal 28 exerts pressure on the hydraulic fluid in the hydraulic line 29 and its associated branches. This is transmitted to the pistons in the wheel cylinders 22–25 via three-way valves 32, 33, 34 and 35 respectively. There is a return hydraulic line 37 coupled between all of the three-way valves and the fluid reservoir of the master cylinder 38.

If the brakes are applied by pressure on the pedal 28 to all four of the wheels and, let us say, one of the two front wheels 11R or 11L begins to skid, the skid-minimizing system of the present invention comes into play. This occurs because each of the differential gear assemblies 15 and 20 measures the difference in the velocities of its two associated opposite wheels thereby laterally moving a ring 40 to actuate one of the three-way valves 32–35. It will actuate the one of its two associated valves which is coupled to the then slower-moving wheel whereupon some of the fluid applied through line 29 against the piston in the respective wheel cylinder is bled off back to the hydraulic reservoir of the master cylinder 38 through lines 37 and 39. This will cause some of the pressure exerted against the slower moving wheel to be relieved whereupon it can gain speed thereby equalizing the speeds of the two wheels and reducing the skidding. The reduction in the brake pressure exerted against the slower-moving wheel will be a function of the extent to which the three-way valve is actuated which, in turn, depends on the extent of the lateral movement of the ring 40.

Figure 2:
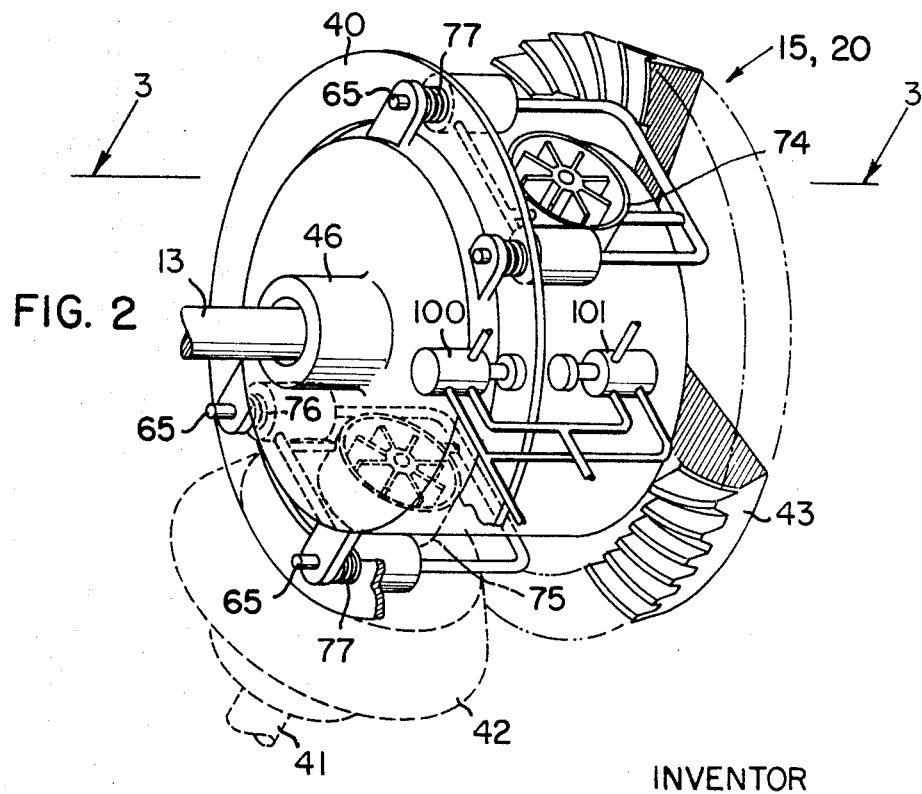
FIG. 2 is a fragmentary perspective view of the differential gear assembly used as one component of the system shown in FIG. 1.
Figure 3:
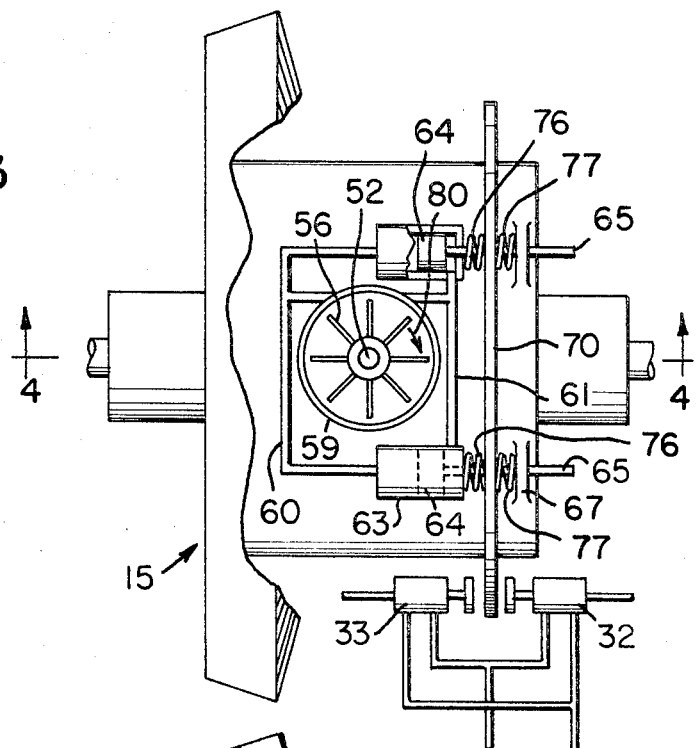
FIG. 3 is a plan view of the apparatus shown in FIG. 2 as seen from the line 3—3 therein.
Figure 4:
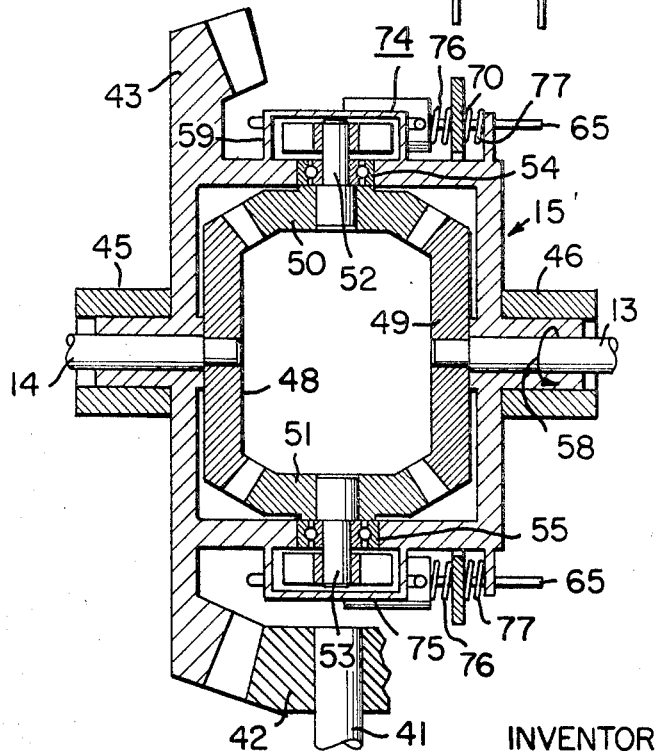
FIG. 4 is a sectional view of the apparatus shown in FIG. 3 as viewed from the line 4—4 in FIG. 3.

Referring now to FIGS. 2, 3 and 4, the structure and operation of the assembly 15 will now be explained in more detail, its structure and operation being identical to that of assembly 20. The transmission shaft 41 shown in phantom lines runs from the gear box or equivalent and is connected to a drive pinion 42. The pinion 42 meshes with a large bevel or ring gear 43 which also is integral with the housing for four differential bevel gears as will be explained. The members 45 and 46 are the frame of the whole axle assembly in which are located axles 13 and 14 respectively. As the drive shaft 41 turns, it will drive the gear-frame 43 to revolve in the direction perpendicular to the axes of the axles.

Within the gear-frame 43 are located four meshing bevel gears. The gears 48 and 49 are keyed to the axles 14 and 13 respectively for revolution therewith. There are two additional differential gears 50 and 51 which mesh with axle gears 48 and 49 as shown. These gears are fixedly mounted to shafts 52 and 53 respectively which are journaled in bearings 54 and 55 disposed in apertures in the gear-frame 43.

Before going into the operation of the anti-skid portions, the principal of operation of the differential gear will be summarized. When the vehicle is moving straight ahead and the opposed wheels are moving at the same velocity, their associated axle gears 48 and 49 will also be turning at the same speed. Thus, since there are opposite moments being exerted on the gears 50 and 51 from each side, they will not be rotating about their respective shafts. Consequently when the drive pinion 42 causes the gear 43 to rotate, since the gears 50 and 51 are not rotating, they will turn the gears 48 and 49 in the same direction causing the axles 13 and 14 to turn also.

On occasion, as when the vehicle turns a corner, the respective velocities of the two wheels will change. Thus, if it is assumed that because of a turn the axle 13 is revolving faster than the axle 14 in the direction indicated by the arrow 58, this will cause the gear 50 to rotate clockwise as viewed from above whereas the gear 51 is simultaneously caused to rotate in the opposite direction. This means then that the gear 48 will revolve counterclockwise as viewed from the left of the gear 43. It should be remembered that the gear-housing 43 is itself rotating in the same direction as the arrow 58 and the bevel gears 50 and 51 are causing both of the axles to rotate in the same direction relative to a fixed external point. However, relative to one another the axle 14 is revolving more slowly and may be viewed as having a component of rotation opposite the rotary direction of the axle 13.

To take the opposite case, when the axle 14 is rotated faster than the axle 13 in the same direction as the arrow 58 the axle-gear 48 will be rotating counterclockwise as viewed from the right, gear 50 will be rotating clockwise as viewed from below and the gear 51 will be rotating counterclockwise as viewed from below. The axle gear 49 will be rotating counterclockwise as viewed from the left so that there will be exerted on the axle 13 a component of rotation opposite to the direction of the arrow 58 and opposite to that of axle 14. Thus the axle 13 will effectively be rotating slower than the axle 14.

It is thus seen that the direction and velocity of rotation of the differential gears 50 and 51 will vary depending upon which of the axles is rotating faster and on the difference in their velocities. Since skidding of the type sought to be minimized or overcome by the present invention results from a disparity in the velocity of the wheels connected to the respective opposite axles, the differential assembly may be employed as a differential speed sensor.

In accordance with the present invention, means are provided for detecting which of the opposed wheels is moving faster by sensing in which direction and how fast the differential gears 50 and 51 move. It will be noted that at any instant of time these differential gears always move in opposite directions. If it is assumed that the axle 13 is moving in the direction of the arrow 58 and faster than the axle 14, it will be seen that the differential gear 50 will start to rotate in a clockwise direction as viewed from above and so will the shaft 52. The shaft 52 is attached to a vaned impeller 56 located in a generally cylindrical housing 59 that is attached to, or formed integral with the gear-housing 43. The housing 59 is filled with a hydraulic fluid and is connected toward one side thereof by two conduits 60 and 61 to a cylinder 63. In the cylinder there is a piston 64 connected to a shaft 65 that extends outside the cylinder 63 through a sealed aperture therein. The shaft 65 is stabilized outside the cylinder 63 by passing through an aperture in one of the several ears 67 that are connected to or formed as part of the housing 43.

There is also an actuator ring 70 which is disposed around the gear-frame 43 and contains a number of apertures through which the shaft 65 passes and is fixedly attached. While only the upper cylinder 59 and its associated hydraulic actuating apparatus will be described in detail, it should be understood that the same construction and operation is employed in the lower pumping assembly opposite cylinder 59 which is indicated generally at numeral 75. The ring normally is urged to a normal, inactive position by centering it between helical springs 76 and 77.

It should also be understood that instead of two of these pumping assemblies located on opposite sides of the housing, there may be three located at 120° from one another or a single pump supplying a multiplicity of cylinders connected in parallel. These cylinders would also be spaced at 120° from one another. The use of three or more cylinders may have advantages in equalizing the pressure applied to the ring 70 at a plurality of points but would add to the cost of the system.

Located on either side of the ring 70 and positioned to be engaged by it when it is displaced laterally from a normal inactive position are the two three-way valves 32 and 33. As will be recalled, when these valves are actuated, they will bleed-off some of the brake fluid applied to their associated wheel cylinders thereby lessening the braking action on the associated wheels. When not actuated, the valves enable hydraulic pressure through line 29 to be exerted against the wheels via the wheel cylinders.

If axle 13 rotates faster than axle 14 in the direction of arrow 58, the rotation of gear 50 will cause the impeller 56 to move in the direction of the arrow 80 in FIG. 3. This will cause high pressure to be built up in the conduit 61 and low pressure in the conduit 60 thereby causing the piston 64 to move toward the left and with it the ring 70 presses the actuator of the valve 33 inward. When the actuator moves inward, it will be seen that some of the hydraulic fluid applied to the wheel cylinder of the associated brake to be bled off to the master cylinder and hence the brake pressure on that wheel will be reduced correspondingly. As a result, that wheel will be allowed to catch up in speed to approach that of the opposite wheel.

As stated before, the gear 51 which is connected to the impeller of the assembly 75, rotates in a direction opposite to that of gear 50. Thus, when axle 13 is rotating as shown by the arrow 58, the gear 51 will be rotating counterclockwise as seen from above. Therefore, its corresponding pump chamber and associated conduits leading to the actuator piston must be connected so that high pressure applied to the right side of the piston will cause the ring 70 to move to the left.

When axle 14 rotates faster than axle 13, the direction of rotation of the gears 50 and 51 is reversed, the direction of the valved impeller reverses, and in the case of the upper pump assembly 74, the piston 64 is urged to the right until the ring 70 actuates the three-way valve 32 thereby relieving pressure on its associated wheel so that it can speed up.

Non-driven wheels

Figure 7:
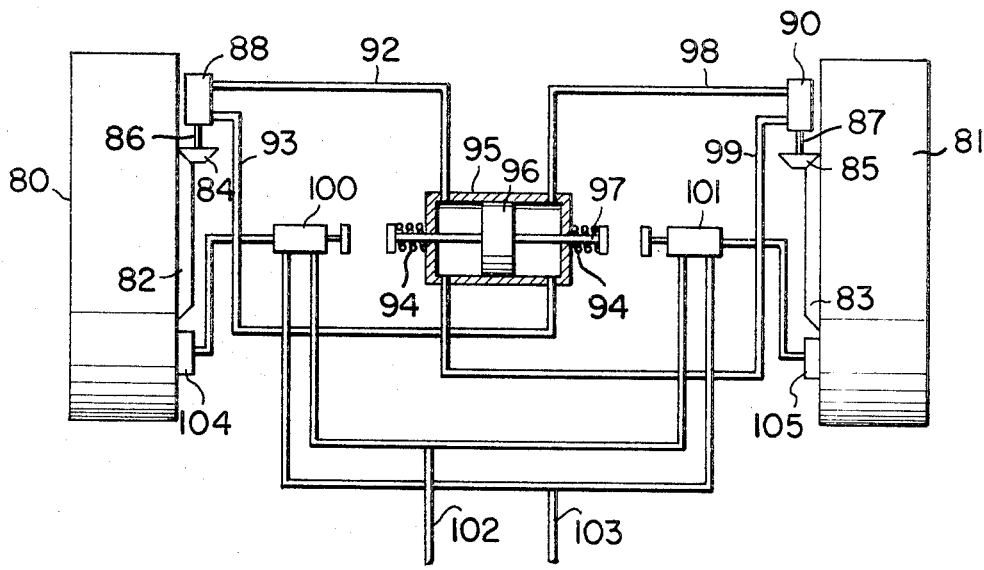
FIG. 7 is a schematic diagram of another embodiment of the present invention as applied to non-driven wheels.
Figures 5, 6:
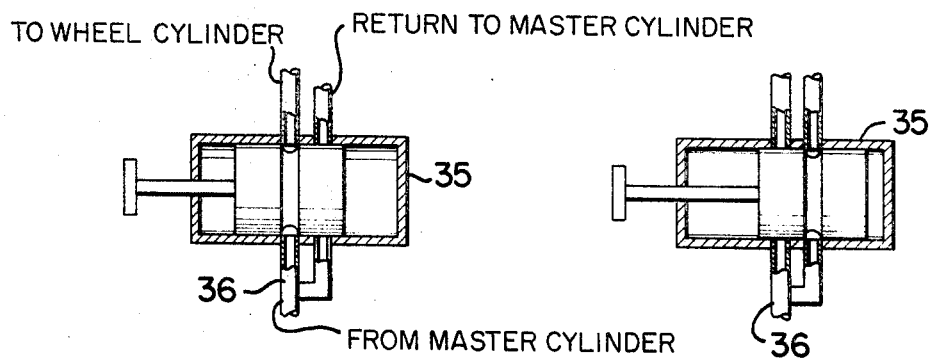
FIGS. 5 and 6 are sectional views of two operative positions of a three-way valve shown schematically in FIG. 1.

The system shown above is most practical in a vehicle where all four wheels are driven. If the present invention is to be applied to a two-wheel drive vehicle, the system previously explained can be applied only to the two driven wheels. The undriven wheels can either use a conventional braking means or another form of the present invention such as the one illustrated in FIG. 7. In this system, both of the wheels 80, 81, both of which are undriven, have associated with them respective ring gears 82 and 83 which are mounted for rotation therewith. Two pinions 84 and 85 respectively mesh with the ring gears 82 and 83 causing shafts 86 and 87 to rotate. These shafts are connected to impeller pumps 88 and 90. Pump 88 has lines 92 and 93 for conducting hydraulic fluid to and from differential hydraulic cylinder 95. In the latter there is a piston 96 mounted on an axial shaft 97, the ends of the shaft 97 protruding through liquid sealed apertures in the cylinder 95. The pump 90 has two hydraulic lines 98 and 99 connected to opposite sides of the piston 96. On each side of the cylinder 95 is located a three-way valve 100 and 101 constructed as explained in connection with previous figures. They are connected, via hydraulic lines 102 and 103, to the master cylinder high pressure and reservoir sides and to the wheel cylinders 104 and 105 respectively.

If both of the wheels 80 and 81 are rotating at the same speed, their respective pumps 88 and 90 are pumping fluid through the lines 92 and 98 into the cylinder 95 at the same pressure so that the piston 96 is immobilized in the center of the cylinder and does not contact either of the valves 100 and 101. Should the speed of wheel 81, for example, exceed by a predetermined amount the speed of wheel 80, the pump 90 will exert more hydraulic pressure through line 98 on the right side of the piston 96 thereby urging it to the left overcoming the force exerted by the centering springs 94. In so doing, the left end of shaft 97 will actuate the three way valve 100 to an extent determined by the speed of wheel 81 and cause the valve 100 to bleed off some of the fluid from the wheel cylinder 104 back to the master cylinder. Thus, the pressure on wheel 80 will be reduced and it will thereby tend to gain speed to equal that of wheel 81 thereby reducing the skidding tendency. If wheel 80 should rotate faster, the piston 96 will be urged to the right and valve 101 will operate to reduce the pressure on wheel 81 exerted by the wheel cylinder 105.

Instead of using a three-way valve at each end of the cylinder, one could use a single four-way valve. Also, instead of a double-ended cylinder, a single-ended cylinder with internal centering springs could be used and the shaft would operate the four-way valve mentioned above.

In some cases, the differential gear system shown in FIG. 2 may be applied to wheels that either are completely undriven, in which case there would be no driving gear 42, or to wheels that sometimes are driven, sometimes not as in a two-four wheel drive vehicle. If this is done, the ring gear 43 could be dispensed with except when the wheels are operated in the driven mode.

I claim:
1. An anti-skid system for wheeled vehicles comprising:
 (a) a plurality of braking means associated with respective ones of said wheels,
 (b) means consisting of mechano-hydraulic means coupled to two of said wheels for detecting differences in the speed thereof and for reducing the braking action applied to the slower of said two wheels as a function of said difference, said means concluding differential gear means coupled to said two wheels, said differential gear means including at least one gear whose rotational velocity is a function of the difference in the speed of said two wheels, hydraulic pumping means coupled for direct drive by said one gear, and valve means actuated by said hydraulic pumping means and operating to reduce the pressure applied by the braking means associated with the slower of said two wheels.

2. The system according to claim 1 wherein said differential gear means includes first and second bevel gears attached to first and second axles respectively connected to said two wheels, wherein said one gear is a third bevel gear which meshes with said first and second gears, all of said gears being mounted in a frame which is caused to revolve, in response to a connection to driving means, in the same direction as said wheels, and further wherein said hydraulic means includes a hydraulic pump coupled to said third bevel gear and having an input and an output, a piston mounted on an axial shaft in a cylinder, conduit means for bringing said output and input of said pump into communication with the interior of said cylinder on either side of said piston, and a ring connected to said shaft and being mounted for lateral movement around said housing, said lateral movement enabling actuation of said valve means.

3. The system according to claim 2 wherein said valve means includes first and second valves mounted on either side of said ring, each of said valves being connected to the wheel cylinder of an associated wheel and to the high pressure and reservoir sides respectively of the master brake cylinder, each of said valves enabling said high pressure side to be in communication with said wheel cylinder when said valve is not actuated, each of said valves when not actuated bypassing a predetermined amount of hydraulic fluid from said high pressure side around said wheel cylinder thereby to lessen the hydraulic pressure applied thereto.

4. The system according to claim 3 wherein there is a fourth bevel gear which meshes with said first and second gears and there is a second hydraulic pump connected to said fourth bevel gear, both of said pumps being mounted on said housing, wherein there is a corresponding second cylinder with a second piston mounted on a second shaft therein, and wherein said second shaft is also connected to said ring.

5. The system according to claim 2 wherein spring means external to said cylinder normally biases said ring to a position in which it does not actuate said associated valves.

References Cited
UNITED STATES PATENTS

| | | | |
|---|---|---|---|
| 2,869,687 | 1/1959 | Keim et al. | 303—21 X |
| 3,004,801 | 10/1961 | Wrigley | 303—21 |
| 3,264,039 | 8/1966 | Cadiou | 303—21 X |
| 3,264,040 | 8/1966 | Brueder | 303—21 |
| 3,329,470 | 7/1967 | Warren | 303—21 |
| 2,401,628 | 6/1946 | Eksergian | 303—21 X |

FOREIGN PATENTS 919,786    2/1963    Great Britain.

MILTON BUCHLER, Primary Examiner

J. J. McLAUGHLIN, JR., Assistant Examiner

U.S. Cl. X.R.
180—1; 303—6, 10